Sept. 22, 1964
L. V. HEWITT
3,149,536
AUTOMATIC SLIDING PANEL OPERATORS
Filed March 17, 1960
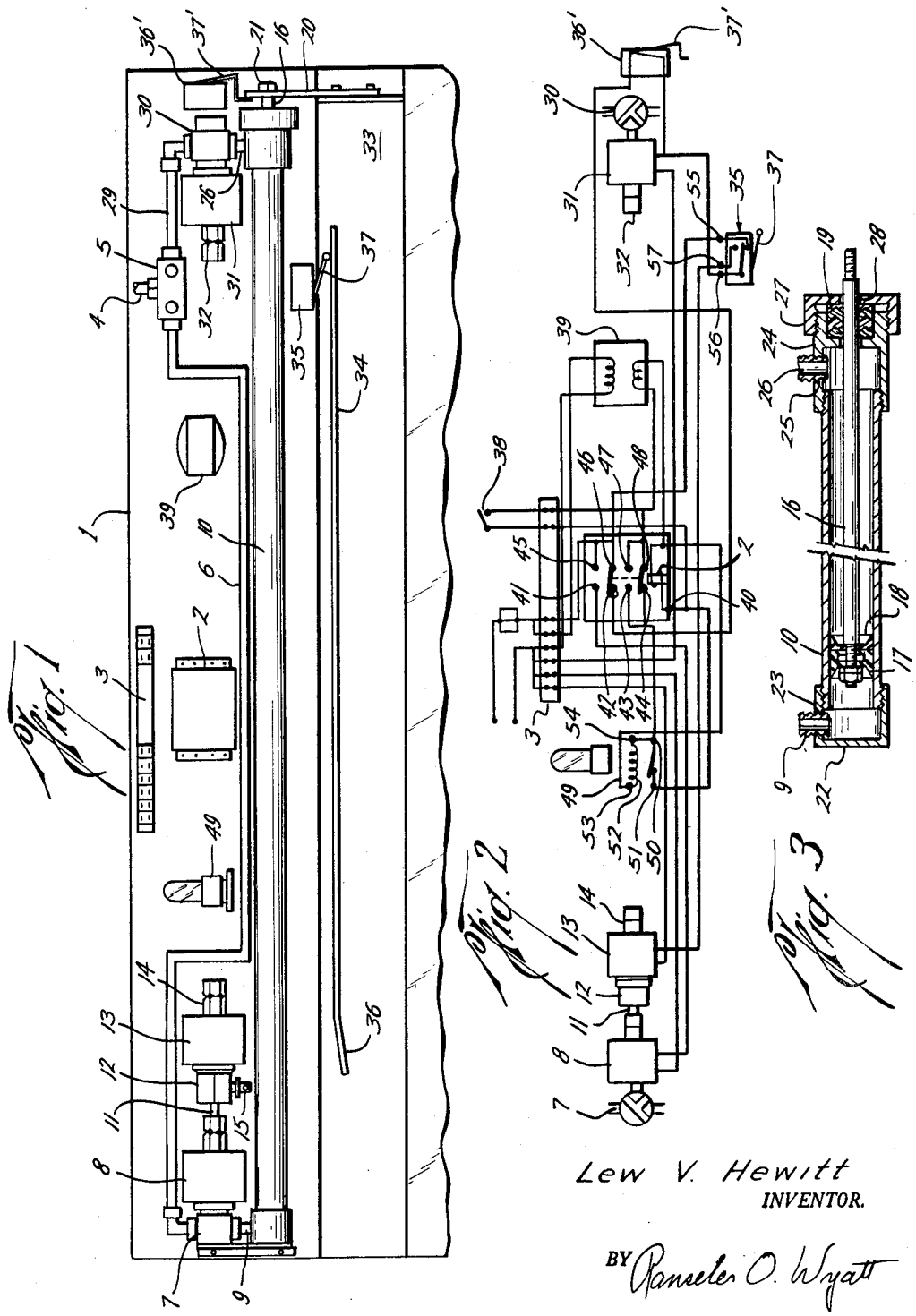
Lew V. Hewitt
INVENTOR.
BY Ranseler O. Wyatt
ATTORNEY

3,149,536
AUTOMATIC SLIDING PANEL OPERATORS
Lew V. Hewitt, Corpus Christi, Tex., assignor to Horton Automatics, Inc., Corpus Christi, Tex., a corporation of Texas
Filed Mar. 17, 1960, Ser. No. 15,754
2 Claims. (Cl. 91—35)

This invention relates to new and useful improvements in an automatic sliding panel operator.

It is an object of the invention to provide an automatic sliding panel operator having direct connection and being in the same plane with a sliding panel to provide rapid and automatic opening and closing of the panel when activated.

It is another object of the invention to provide an arrangement of solenoid valves and electrical circuits affording a snubbing or cushioning action near the end of the opening and closing cycle of a sliding panel providing smooth, safe and rapid operation without slamming.

It is another object of the invention to provide a sliding panel operator without compound lever attachments and providing a direct attachment to the sliding panel with no springs or counter weights required to close the panel.

It is another object of the invention to provide a mechanism which, in case of mechanical or electrical failure, permits manual operation, which is automatically afforded without alteration of the mechanism.

With the above and other objects in view, the invention has relations to certain novel features of construction, operation and arrangement of parts more particularly defined in the following specifications and illustrated in the accompanying drawings, wherein:

FIGURE 1 is a side elevational view of the device, showing its attachment to a panel.

FIGURE 2 is a wiring diagram of the circuits employed.

FIGURE 3 is a side elevational, cross sectional view of the actuator mechanism.

Referring now more particularly to the drawings, the numeral 1 designates a mount for the device to be inserted in the walls of a building above an access opening. A relay 2 is centrally positioned on the mount 1 and a panel board 3 is positioned adjacent the relay 2. An air inlet conduit 4 forming a supply line from a suitable source (not shown), leads into the adjustable valve 5 and conduit 6 leads from the valve 5 to a solenoid controlled valve 7, which is actuated by the solenoid 8. The valve 7 has a conduit 9 leading into the cylinder 10. A conduit 11 extends through the solenoid 8 and extends into the valve 12 which is actuated by the solenoid 13. An exhaust conduit 14 extends from the valve 12 through the solenoid 13. The valve 12 has an adjustable relief port 15.

Longitudinally movable in the cylinder 10 is the actuating rod 16, on one end of which are the double pistons 17, 18. The other end of the rod 16 extends through suitable packing 19 and is externally threaded at its extended end to receive the arm 20, and securing nut 21. A cap 22 is mounted on one end of the cylinder 10, which has an internally threaded port 23 to receive the conduit 9 and a sleeve 24 is mounted on the other end of the cylinder 10 having an internally threaded port 25 into which the conduit 26 is mounted. A cap 27 is mounted on the outer end of the sleeve 24, which maintains the packing 19 in place, and which has the port 28 through which the rod 16 extends.

Leading from the valve is a conduit 29 which extends into the solenoid controlled valve 30. The solenoid 31 actuates the valve 30 and an exhaust conduit 32 extends from the valve 30 through the solenoid 31. The conduit 26 extends from the cylinder 10 to the valve 30.

The arm 20 is mounted on one end of the panel 33 to be actuated. A limit switch control 34 is mounted on the panel 33 and is in contact with the limit switch 35, one end of the control 34 being downwardly turned as at 36. A control arm 37, which extends from the limit switch 35, bears against the control 34 normally maintaining the switch 35 in first position. Another limit switch 36' is mounted above the arm 20, when the rod 16 is in fully closed position, and a control arm 37' extends from the switch 36' and is contacted and actuated by the arm 20 when the rod 16 approaches fully closed position.

An actuator switch 38 spring biased towards open position, which may be located beneath a floor mat in front of the access (not shown), when closed, is momentarily energized and closes the circuit between the transformer 39 and the relay 2, which switches relay 2, closing contacts 41 and 45, energizing solenoid 8, opening valve 7 allowing pressurized air from the adjustable valve 5 to enter the cylinder 10 through the conduit 9 and to flow against piston 17, moving the pistons 17, 18 in one direction, thus moving the rod 16, arm 20 and panel 33, causing the panel 33 to start opening. This same switching of the relay 2 also energizes the low voltage contact 43, completing a circuit to the time delay relay 49 at point 50 and on through the normally closed relay 49 to point 51 then on the relay 2 at point 40 which has the effect of holding the relay 2 in switched position sufficiently long enough for the panel 33 to fully open. The heater 52, between points 53 and 54 cause the relay points 50, 51 to open after a predetermined length of time, breaking the circuit to relay 2.

As the sliding panel opens, and the downwardly turned portions 36 of the limit switch control 34 reaches the extended end of the arm 37, the arm moves outwardly and the switch 35 is moved into the second position, energizing and actuating the solenoid 31, opening the valve 30, by closing the circuit between point 36 through point 55 in the limit switch 35, to point 56, to the solenoid 31. This opens the valve 30 to permit flow of air under pressure into the cylinder 10 through the conduit 26 to brake or cushion the sliding panel 33, the air acting against the piston 18. The location of the switch 35 may be varied as desired, and, while the cushioning action thus described is supplemented by suitable bumpers (not shown) mounted on the panel, the degree of cushioning is controlled by the location of the switch 35.

When the time delay relay 49 has opened the circuit between points 50 and 51, and the relay 2 has opened, or where the switch 38 has remained open for longer than necessary to deactivate the relay 49, the relay 2 resumes its normal position, which releases the closed solenoid 8 and closes the valve 7, blocking the flow of pressurized air through the valve 7, but leaves the solenoid 31 activated, and valve 30 open through the relay 2, contact point 42 through the limit switch 36'.

The effect of releasing the pressure on the piston 17, by closing the valve 7, with the valve 30 remaining open, is to apply pressure to the piston 18, and the panel 33 will start moving to closed position. As the turned down portion 36 of the limit switch control 34 contacts the limit switch arm 37, the switch is moved to first position and a circuit through points 56, 57 activates solenoid 13, closing the valve 12, causing air through conduit 9 to pass through conduit 11 and to be exhausted through adjustable valve 15, which is restricted to compress air against the piston 17, restraining the last portion of the closing cycle of the panel 33.

When the panel 33 reaches fully closed position, the arm 20 contacts the control arm 37' of the limit switch 36' and opens the switch 36', breaking the circuit to the solenoid 31, closing the valve 30. This final action leaves all of the circuits to the solenoids broken, so that none of the solenoids are activated and air exhausts freely through the exhausts 14, 32 and blocking the flow of pressurized air through the valves 7, 30. This permits manual operation of the panel, in the event of electrical failure, or the like. In the event there is any leakage of air through the valves 7, 30, the air will freely exhaust rather than bear against the pistons 17, 18. The limit switch 36' being activated by the arm 20 moving out of contact with the control arm 37', in the event the door is opened by vibration or the like, the solenoid 31 will be immediately activated, opening the valve 30 and closing the panel.

In use, the cylinder 10 is very small, so that the device may be operated with a low pressure air supply, varied by the size of the panel 33, the flow being adjusted through the valve 5, which will have the effect of very little torque on the opening and closing cycle, and in conjunction with the slowing and cushioning effect upon completion of either the opening or closing operation, which provides safety in usage. It is to be noted that the opening, closing and cushioning are all accomplished without the use of counterweights or springs. If desired, the electrical circuits and solenoid valves may be remotely positioned with reference to the operating cylinder.

While the foregoing is considered a preferred form of the invention, it is by way of illustration only, the broad principle of the invention being defined by the appended claims.

What I claim is:

1. In an automatic sliding panel operator, a double acting piston, a panel connecting means actuated by said piston, a source of supply of pneumatic pressure, conduits leading from said source of supply to said pistons, valves in said conduits selectively controlling the flow of pressure to one side of said piston to move said panel in one direction and to the other side of said piston to move said panel in the opposing direction and to provide a supply of cushioning pressure against said piston upon nearing completion of its movement in one direction, solenoids controlling said valves, an electrical circuit in connection with said solenoids, a switch in said circuit for energizing one of said solenoids to open one of said valves to move said piston in one direction, a time delay switch in said circuit simultaneously activated which holds said solenoid open a predetermined length of time, limit switches in said circuit activated by contact with the panel connecting means to activate one of said solenoids and one of said valves to discharge a supply of pressure against the said piston opposite its direction of movement to cushion the stop of the piston.

2. In a sliding panel operating mechanism, a sliding panel, a stationary cylinder mounted above said panel, a double action pneumatic piston mounted in said cylinder, an actuating rod mounted on said piston and extending longitudinally from said cylinder, a connecting arm mounted on the extended end of said rod and said panel, a source of pneumatic pressure having conduits leading therefrom to each end of said cylinder, valves controlling the flow through said conduits, solenoids controlling said valves, electrical circuits to said solenoids, a plurality of switches in said circuits, one of said switches being manually operated to start the cycle of operation causing a flow of pneumatic pressure into said cylinder against one side of said piston moving said piston and panel into open position, a switch bar carried by said panel, a switch in position to be contacted by said bar to start the flow of pressure to the other side of said piston to cushion the completion of the opening of said panel, and to open an exhaust valve to permit restricted exhaust of the pressure on the opening side of said piston as pressure is exerted against the closing side of said piston moving the panel to closed position, the restricted exhaust providing restraining action on the closing movement of said panel, and a switch on the end of said cylinder to be actuated by said panel as it moves into closed position to break the electrical circuits and deactivate the valves and solenoids.

References Cited in the file of this patent

UNITED STATES PATENTS

| | | |
|---|---|---|
| 1,382,872 | Tritle | June 28, 1921 |
| 2,324,727 | Shartle | July 20, 1943 |
| 2,362,744 | Culbertson | Nov. 14, 1944 |
| 2,546,469 | Muddiman | Mar. 27, 1951 |
| 2,566,811 | Stevenson | Sept. 4, 1951 |
| 2,578,894 | Maurer | Dec. 18, 1951 |
| 2,612,951 | Palmleaf | Oct. 7, 1952 |
| 2,717,502 | Barton | Sept. 13, 1955 |
| 2,748,633 | Bedker | June 5, 1956 |
| 2,755,766 | Morris | July 24, 1956 |
| 2,777,425 | Adams et al. | Jan. 15, 1957 |
| 2,835,488 | Hubbell | May 20, 1958 |
| 2,900,791 | Kinsey | Aug. 25, 1959 |